United States Patent
Aubry et al.

(10) Patent No.: US 7,038,161 B2
(45) Date of Patent: May 2, 2006

(54) WELDING UNIT WITH MINIATURIZED LASER BEAM

(75) Inventors: Pascal Aubry, Paris (FR); Thierry Dubois, Arcueil (FR); Sophie Hertmanowski, Mennecy (FR); Hervé Launais, Brunoy (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/487,936

(22) PCT Filed: Jul. 4, 2002

(86) PCT No.: PCT/FR02/02332

§ 371 (c)(1),
(2), (4) Date: Mar. 3, 2004

(87) PCT Pub. No.: WO03/004214

PCT Pub. Date: Jan. 16, 2003

(65) Prior Publication Data

US 2004/0238504 A1 Dec. 2, 2004

(30) Foreign Application Priority Data

Jul. 5, 2001 (FR) .................................. 01 08920

(51) Int. Cl.
*B23K 26/14* (2006.01)
*B23K 26/20* (2006.01)

(52) U.S. Cl. .............................. 219/121.63; 219/121.84

(58) Field of Classification Search ............................... 219/121.63–121.72, 121.84
See application file for complete search history.

(56) References Cited

U.S. PATENT DOCUMENTS

| 3,597,578 | A | * | 8/1971 | Sullivan et al. | ......... 219/121.67 |
| 4,128,753 | A | * | 12/1978 | Sharp | ..................... 219/121.63 |
| 4,319,120 | A | * | 3/1982 | la Rocca | ................ 219/121.84 |
| 4,723,063 | A | * | 2/1988 | Armier et al. | ......... 219/121.63 |

(Continued)

FOREIGN PATENT DOCUMENTS

| DE | 003931401 A1 | * | 3/1991 |
| DE | 009391401 A1 | * | 3/1991 |

(Continued)

*Primary Examiner*—Samuel M. Heinrich
(74) *Attorney, Agent, or Firm*—Oblon, Spivak, McClelland, Maier & Neustadt, P.C.

(57) ABSTRACT

The invention provides a welding device (10) using a power laser beam (22), the device (10) being miniaturized, the device (10) being suitable for being moved very close to the surface (52*a*) of the part (52) to be welded and of reaching welding zones that are difficult to access, but without vapor and particles of molten metal (56) being capable of penetrating into the inside and dirtying the optical components (28, 48, 46). Such a device is remarkable in that it includes a feed (26) of gas under pressure suitable for producing a primary flow of gas (50) leaving via the front opening (20) together with the laser beam (22), and in that it also includes a nozzle (60) connectable to a source of gas under pressure, said nozzle (60) producing a secondary flow of gas (62) sweeping the front opening (20) transversely, thereby deflecting the primary flow of gas (50) laterally.

20 Claims, 2 Drawing Sheets

U.S. PATENT DOCUMENTS

| | | | | |
|---|---|---|---|---|
| 4,839,495 A | * | 6/1989 | Kitera et al. | 219/121.63 |
| 4,992,643 A | * | 2/1991 | Fuerschbach et al. | 219/121.63 |
| 5,565,120 A | * | 10/1996 | La Rocca | 219/121.72 |
| 5,981,901 A | * | 11/1999 | La Rocca | 219/121.63 |
| 5,991,360 A | * | 11/1999 | Matsui et al. | 378/119 |
| 6,204,475 B1 | * | 3/2001 | Nakata et al. | 219/121.84 |
| 6,531,682 B1 | * | 3/2003 | Guttler | 219/121.84 |
| 2002/0036190 A1 | * | 3/2002 | Tamura et al. | 219/121.63 |

FOREIGN PATENT DOCUMENTS

| | | |
|---|---|---|
| DE | 10226359 A1 * | 12/2003 |
| EP | 0300458 | 1/1989 |
| EP | 000300458 A1 * | 1/1989 |
| EP | 0514235 | 11/1992 |
| JP | 05169288 A * | 7/1993 |
| JP | 06106376 A * | 4/1994 |

* cited by examiner

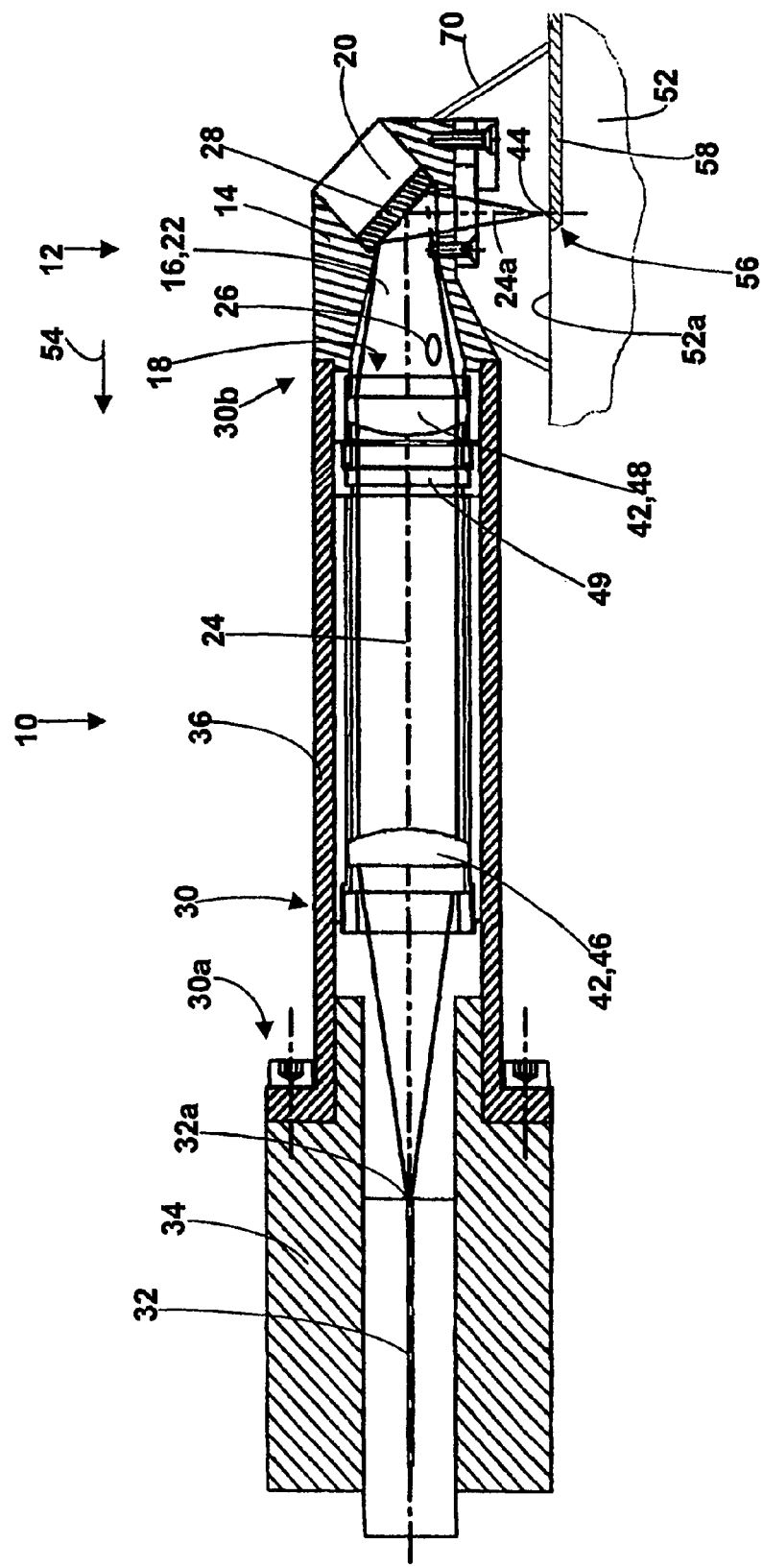
Fig: 1

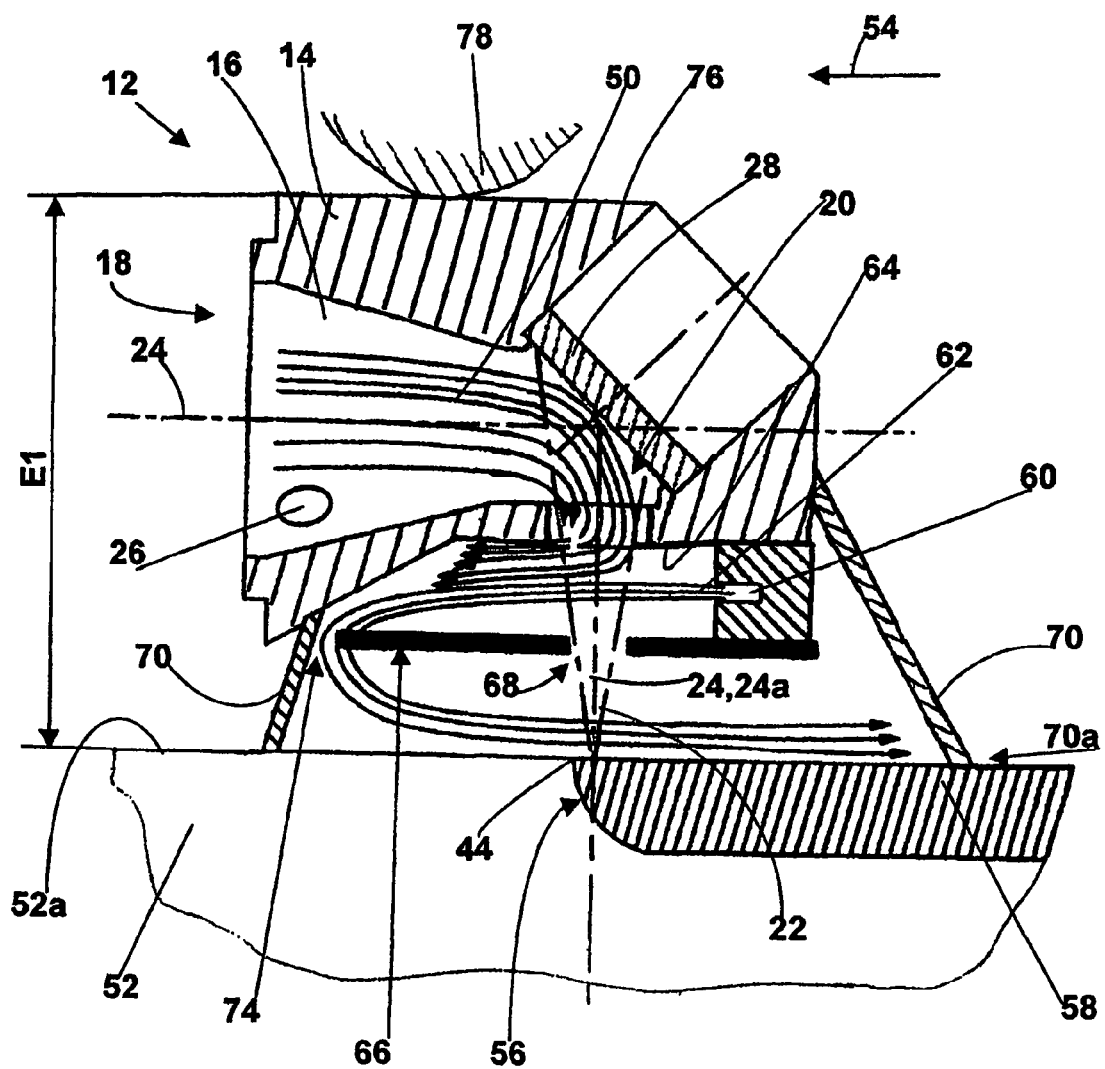
Fig : 2

US 7,038,161 B2

WELDING UNIT WITH MINIATURIZED LASER BEAM

TECHNICAL FIELD OF THE INVENTION

The invention relates to welding by a power laser beam, e.g. by way of indication, at a power of 500 watts (W) to several kilowatts (kW), and more particularly it relates to a miniaturized laser beam welding device suitable for being brought very close to the surfaces of parts to be welded and capable of reaching surfaces for welding that are difficult to access because of obstacles situated over them.

STATE OF THE ART AND PROBLEM POSED

It is known to weld metals by means of a power laser beam. To do this, a welding device is used that comprises an enclosure of generally elongate shape in which a laser beam can travel and leave via one end of the enclosure in order to touch the part that is to be welded. The enclosure is light-tight in order to protect the operator from any accidental propagation of the laser beam outside the enclosure. The term "light-tight" is used to mean that the enclosure prevents any accidental exit of the laser beam, e.g. as a result of an optical component being wrongly adjusted.

Inside the enclosure, the laser beam travels along a path comprising in succession: a power laser source, a converging optical system, and a "front" opening through which the laser beam can leave the enclosure going towards the part to be welded. The converging optical system concentrates the laser beam on a focus situated outside the enclosure, the part naturally being placed at said focus in order to be welded. The laser source may be a laser generator, or it may be the end of an optical fiber bringing the laser beam into the enclosure from a remote generator. In more elaborate versions, the enclosure may be articulated and/or include one or more optical mirrors disposed on the path of the laser beam so as to deflect the laser beam appropriately.

To simplify the use of language, an object is said to be situated "in front of" the front opening when it is outside the device and in register with the front opening. Conversely, an object is said to be "behind" the front opening when it is on the other side of the front opening.

During welding, the optical components need to be protected from vapor and droplets of molten metal. The enclosure normally performs this protection function, however vapor and droplets of molten metal can pass through the front opening, penetrate into the enclosure, and dirty the optical components, in particular those which are close to the front opening. Various means are used to prevent this:

- reducing the diameter of the front opening to the strict minimum needed for passing the laser beam;
- injecting an inert gas under sufficient pressure into the enclosure, the gas leaving through the front opening and thus constituting an obstacle to vapor and droplets of molten metal; and
- locating the optical components at a distance from the front opening or locating the front opening at a distance from the part to be welded.

Patent EP 0 514 235 discloses a device making it possible to weld surfaces having obstacles overlying them, that welding device comprising an elongate tubular enclosure, a laser source being disposed at one end, the front opening being disposed laterally at the other end, a mirror being disposed behind the front opening and deflecting the laser beam from the laser source towards the opening, the working end of the welding device being passed between the obstacles and the surfaces to be welded, specifically the inside wall of a nuclear power station tube. An inert gas leaves through the front opening and protects the surface that is being welded from ambient air. That welding device nevertheless presents the drawback of exposing the mirror to vapor and droplets of molten metal because:

- the mirror is very close to the molten metal in the welding zone; and
- the pressure of the protective gas is necessarily limited for reasons of economy and so as to avoid dispersing the molten metal. It can be seen in the figure that the opening is much larger than the laser beam passing through it. This enables the zone that is being welded to be thoroughly surrounded by inert gas, without creating a jet of gas that could disperse the molten metal. Unfortunately, the protective gas is traveling only slowly when it passes through the front opening. It therefore constitutes only a minor obstacle to vapor and droplets of liquid metal, and consequently the mirror is quickly degraded.

The mirror therefore needs to be changed frequently. Such a welding device,is therefore suitable for repairing thin parts that require low power only, but it is not suitable for industrial use in a workshop on thick parts using a high power laser.

A first problem to be solved is that of providing a welding head whose front opening is suitable for being brought very close to the surface to be welded without the optical components being dirtied by the vapor and droplets of molten metal and without the molten metal being disturbed, e.g. by a flow of gas passing out through the front opening.

A second problem to be solved is that of providing a welding head suitable for being passed between the surfaces to be welded and nearby obstacles situated above the surfaces to be welded.

SUMMARY OF THE INVENTION

To solve the first problem, the invention provides a miniaturized laser beam welding device, the device comprising a welding head constituted by a wall surrounding a cavity, the wall having an "admission" first opening and a "front" second opening, a laser beam being suitable for entering into the welding head via the admission opening and leaving it via the front opening by following a predefined light path. The welding head is fed with gas under pressure suitable for producing a "primary" gas flow in the cavity and for leaving the welding head via the front opening. Such a device is remarkable in that the welding head includes a nozzle suitable for being connected to a source of gas under pressure, said nozzle being outside the welding head against its wall. The nozzle produces a "secondary" flow of gas under pressure transversely sweeping the space situated immediately in front of the front opening.

The term "transversely" is used to mean that the secondary flow is directly parallel to the surface of the front opening. With such a disposition:

a) the primary flow pushes back the vapor and droplets of molten metal heading towards the front opening, thereby preventing said vapor and droplets from penetrating inside the welding head; and b) the secondary flow strikes the primary flow perpendicularly at the instant it leaves through the front opening, thereby deflecting the primary flow and thus preventing it from reaching the liquid metal which is being formed a little further away in the vicinity of the focus.

Thus, the vapor and droplets of molten metal cannot penetrate into the welding head through the front opening and the molten metal of the weld is not disturbed, deformed, or even dispersed by the primary flow of gas, thus making it possible to place the welding head very close to the surface to be welded, thereby solving the first problem.

The operator gives the primary flow sufficient force to enable it to push back the vapor and droplets of molten metal that approach the front opening. Similarly, the operator gives sufficient force to the secondary flow to deflect the primary flow before it reaches, at least directly, the liquid metal that forms in the vicinity of the focus in front of the front opening.

Advantageously, the welding head also has a shield positioned in front of the front opening, said shield being substantially flat and parallel to the wall of the welding head surrounding the front opening, said shield being made of a rigid material that withstands high temperatures, i.e. niobium, the shield being pierced by a hole positioned on the axis of the front opening, the nozzle being positioned between the shield and the wall of the welding head. The shield enables the primary and secondary flows to be channeled transversely to the front opening, thereby improving protection of the molten metal against the primary flow.

The shield also constitutes a mechanical obstacle to the vapor and droplets of molten metal heading towards the welding head and around the front opening, thereby reducing dirtying of the welding head. The shield acts in particular to form an obstacle to the vapor and droplets of molten metal traveling between the front opening and the nozzle, which droplets would, without the shield, be likely to be moved back in front of the front opening by the secondary flow. Thus, and in spite of the presence of the hole situated between the molten metal and the front opening, this obstacle effect further improves the integrity of the inside of the welding head against vapor and droplets of molten metal.

The shield is advantageously removable so as to allow it to be cleaned or replaced once it has become dirty.

Also advantageously, the welding head includes a skirt surrounding the front opening, the nozzle, and the shield, the skirt being open and flaring in front of the shield, the skirt being made of a material that is thin, flexible, and gas-proof, a gap being left between at least one edge of the shield and the skirt. The skirt thus co-operates with said gap to bring the primary and secondary flows of gas over the zone being welded, thereby protecting the welding zone from ambient air while consuming less gas. The skirt is of a length suitable for coming into contact with the surface of the part to be welded, said skirt also enabling the gas of the primary and secondary flows to be retained above the welding zone and consequently simultaneously reducing gas consumption and oxidation of the part that is being welded.

Also advantageously, the welding head may be provided with a mirror positioned immediately behind the front opening and deflecting the laser beam through 90° towards said front opening. This disposition enables the size of the welding head behind the front opening to be reduced, thereby enabling the welding head to be passed between the surfaces to be welded and a nearby obstacle, with this disposition enabling the second problem to be solved.

In particular, the welding head has a thickness E1 between the front opening and the wall opposite from the front opening that is less than 50 millimeters (mm).

DESCRIPTION OF THE FIGURES

The invention will be better understood in view of a detailed embodiment and from the accompanying figures.

FIG. 1 shows a welding head mounted at the end of a welding device fed with light by an optical fiber.

FIG. 2 shows the welding head.

DETAILED DESCRIPTION

Reference is made initially to FIG. 1. The welding device 10 comprises a welding head 12 constituted by a wall 14 defining a closed cavity 16, the wall 14 being light-tight, the wall 14 nevertheless having an "admission" opening 18 and a "front" opening 20, a laser beam 22 being capable of penetrating into the cavity 16 via the admission opening 18 and of leaving the cavity 16 via the front opening 20 by following a light path 24. The welding head 12 also has a feed 26 suitable for being connected to a source of inert gas under pressure, e.g. argon, said feed 26 in this example being a duct passing through the wall 14 so as to open out inside the cavity 16.

In this example, the admission opening 18 and the front opening 20 are plane, circular, and centered on the light path 24 which constitutes the axes thereof. The admission opening 18 and the front opening 20 are perpendicular. A mirror 28 is placed in the cavity 16 in the light path 24. The mirror 28 deflects the laser beam though 90° so as to direct it towards the front opening 20. The mirror must naturally be capable of withstanding high temperatures. By way of example, it can be made of ZnSe, of copper with a cooling circuit, or it can be of the "dielectric" type.

The welding device 10 also comprises an enclosure 30 of generally elongate shape with its opposite ends being referenced 30a and 30b. A laser light source 32 is placed at a first end 30a and produces the laser beam 22 which travels inside the enclosure 30 along the light path 24. The laser beam 22 reaches the other end 30b having the welding head 12 attached thereto, the end 30b surrounding the admission opening 18 so as to allow the laser beam 22 to pass from inside the enclosure 30 into the cavity 16 of the welding head 12.

In this example, the laser source 32 is a point source constituted by an optical fiber which delivers laser light from a remote generator (not shown) via its end 32a inside the enclosure 30. Also in this example, the end 30a of the enclosure 30 is constituted by a socket 34 that supports the laser source 32, the socket 34 being extended to the other end 30b by a straight tube 36, the straight tube 36 being attached to the socket by, for example, screws (not referenced). The welding head 12 is also attached to the end of the straight tube 36. In a preferred embodiment, the connection between the welding head 12 and the enclosure 30 is releasable so as to make it possible to combine welding heads 12 of different shapes with straight tubes 36 of different lengths.

The welding device 10 includes an optical system 42 on the light path 24, which system concentrates the laser beam 22 on a focus 44 in front of the front opening 20, outside the welding head 12, the focus 44 being on the light path 24. When the laser source 22 is a point source, the optical system 42 is a converging system and delivers a real image of the laser source 32 at the focus 44. The converging optical system 42 comprises two converging lenses. A first lens is a "collimator" lens 46 which transforms the diverging laser beam that emerges from the end 32a of the optical fiber into a parallel beam, and the second lens 48 is a "focusing" lens transforming the parallel beam into a beam that converges on the focus 44. This disposition makes it possible to use straight tubes 36 of different lengths without changing the position of the focus 44 relative to the front opening 20 of the welding head 12, so long as the position of the collimator lens relative to the end 32a of the optical fiber and the position of the focusing lens 48 relative to the welding head 12 both remain unchanged. In this example, the optical system 42 also comprises a prism 49 disposed between the collimator lens 46 and the focusing lens 48 in the vicinity of the focusing lens, the prism 49 having a cylindrical portion intersecting the laser beam 22 over half of its section, and serving to deflect half of the laser beam 22 slightly to a secondary second focus (not referenced) that is slightly offset relative to the focus 44, where this disposition is itself known.

The welding head is described below in greater detail with reference simultaneously to FIGS. 1 and 2.

The feed 26 produces a "primary" flow of gas 50. The welding head 12 is positioned above the surfaces 52a of the parts to be welded 52, the focus 44 being on said surfaces 52a, the welding head 12 being subjected to displacement parallel to the surfaces 52a, said displacement being represented by a speed vector 54. Under the heating effect of the laser beam 52, the metal melts in the vicinity of the focus 44 and subsequently solidifies in order to form a welding bead 58. The liquid metal that forms in the vicinity of the focus 44 during welding is referenced 56. The liquid metal gives off vapor and droplets that might pass through the front opening 20, penetrate into the cavity 16 of the welding head 12, and touch the mirror 28 which is immediately behind the front opening 20. It will be understood that if the intensity of the primary flow 50 is increased in order to prevent the vapor and droplets of liquid metal 56 penetrating into the cavity 16, the primary flow 50 will reach the liquid metal 56 at a speed that is too fast, thereby causing it to be deformed or even dispersed, and thus deforming the welding bead 58 that is being formed.

The welding head 12 has a nozzle 60 suitable for being connected to a source of gas under pressure (not shown), said nozzle being positioned to deliver a "secondary" flow of gas 62 passing in front of the front opening 20 transversely relative thereto. The secondary flow 62 sweeps the entire surface of the front opening 60 but without penetrating inside the cavity 16 through said front opening 20. The secondary flow 62 thus collides with the primary flow 50 substantially perpendicularly to the light path 24 in front of the front opening 20, the secondary flow 62 thus deflecting the primary flow 50, which can thus no longer arrive directly on the liquid metal 56, which it would disperse. The term "front wall" 64 is applied to the outside surface of the wall 14 of the welding head situated around the front opening 20. In practice, the front wall 64 is planas and is perpendicular to the light path 24 when the light passes through the front opening 20. The nozzle 60 is fixed against the front wall 64 but is eccentric relative to the front opening 20. The nozzle 60 nevertheless points towards the front opening 20 and produces the secondary flow 62 transversely relative to the front opening 20 and parallel to the front wall 64.

A thin flat shield 66 is placed in front of the front opening 20 extending parallel to the front wall 64, i.e. perpendicular to the light path 24, with the nozzle 60 being located between the front wall 64 and the shield 66, the shield 66 being pierced by a hole 68 centered on the light path 24, the shield 66 being closer to the front wall 64 than is the focus 44. The shield is made of a material that withstands high temperature, for example niobium. Such a shield presents several advantages:

firstly, it channels the secondary flow 62 and the primary flow 50 parallel to the front wall 64, thereby providing the liquid metal 56 with better protection against the primary flow 50;

secondly it constitutes an obstacle to vapor and droplets of liquid metal 56, thereby serving to keep the welding head itself becoming dirtied;

finally it constitutes an obstacle to vapor and droplets of liquid metal which would otherwise go between the front opening 20 and the nozzle 60 and could then be deflected towards the front opening 20 by the secondary flow 62. Thus, by providing an additional obstacle and in spite of the holes situated on the light path, the shield 66 further improves the protection of the optical components, and in particular of the mirror 28 against vapor and droplets of liquid metal 56.

The shield may be made of for example, niobium, of a metal alloy in which niobium is the major component, or a nickel-based superalloy. The hole 68 and the front opening 20 are preferably projections of each other relative to the focus 44, thus enabling their dimensions to be restricted to the minimum required for passing the laser beam 22.

A skirt 70 is placed around the laser beam 22 between the front opening 20 and the focus 44, one end of the skirt extending up to the front wall 64 and forming an opening surrounding the front opening 20, the other end of the skirt forming a flared opening around the focus 44. The skirt 70 is made of a material that withstands heat, in particular from droplets of liquid metal 56. The skirt is gas-proof laterally, and also surrounds the nozzle 60 and the shield 66, leaving a gap 74 relative to the edge 66a of the shield 66 opposite from the nozzle 60. The skirt is of a height that is suitable to ensure that, during welding, its flared end 70a is flush with the surface 52a of the part to be welded 52. The skirt 70 brings the primary and secondary flows 50 and 62 over the liquid metal 56 and keeps them there, causing them to pass via the above-defined gap 74. The gas retained in this way is effective in protecting the surface 52a for welding around the liquid metal 56. This gas then leaks out between the skirt 70 and the surfaces 52a that are to be welded together.

During welding, the welding head is moved, preferably in the same direction as the secondary flow 62 leaves the nozzle 60. Thus, the combined primary and secondary flows 50, 62 arrive at slower speed parallel to the welding bead 58 that is being formed, thus avoiding deforming it.

In practice, the shield is removable so that it can be cleaned or replaced once it becomes too dirtied by vapor and droplets of liquid metal. For a welding head that is greatly miniaturized, it can be held by two screws screwed into the front wall, the nozzle being sandwiched between the shield and the front wall.

The skirt 70 is, for example, cut out from closely-woven fiberglass cloth, and its outside face is covered in a silicone elastomer layer that withstands high temperatures, with these two materials being commonly available in trade. Such a skirt is both flexible and resistant to tearing. In addition, the silicone elastomer makes the skirt gas-proof and the fiberglass cloth protects the silicone elastomer from the vapor and droplets of molten metal and also from the heat radiation.

The invention enables the welding device to be greatly miniaturized. That is why the Applicant also claims a welding device comprising a welding head of the invention of size E1 along the axis of the front opening 24a no greater than 50 mm. For a welding head 12 with a skirt 70, this size corresponds in practice to the distance between the flared opening 70a of the skirt 70 and the outside face 76 of the wall 14 behind the front opening 20. Thus, the welding device 10 enables the surfaces 52a of parts 52 to be welded in spite of the presence of an obstacle 78 situated at a distance E1 above the surfaces to be welded 52a.

The present invention has made it possible in particular to provide a welding head that is powered by a 4 kW yttrium aluminum garnet (YAG) laser, while requiring a space of no more than 24 mm above the surfaces 52a to be welded.

What is claimed is:

1. A miniaturized laser beam welding device, the device comprising:
   a welding head constituted by a wall surrounding a cavity, the wall having an "admission" first opening and a "front" second opening, and
   a laser beam being suitable for entering into the welding head via the admission opening and leaving said welding head via the front opening by following a predefined light path, the welding head being fed with gas under pressure suitable for producing a "primary" gas flow in the cavity and leaving the welding head via the front opening,
   wherein the welding head includes a nozzle suitable for being connected to a source of gas under pressure, said nozzle being outside the welding head against its wall, the nozzle producing a "secondary" flow of gas under pressure sweeping the space situated immediately in front of the front opening transversely,
   in which the wall surrounding the front opening is referred to as a "front" wall, wherein the welding head includes a shield positioned in front of the front opening, the shield being substantially flat and parallel to the front wall, said shield being pierced by a hole situated in front of the front opening, the nozzle being positioned between the shield and the front wall.

2. A device according to claim 1, wherein the shield is removable.

3. A device according to claim 1 or claim 2, wherein the shield is made of niobium.

4. A device according to claim 3, wherein the welding head includes a skirt surrounding the front opening, the nozzle, and the shield, the skirt being open and flaring in front of the shield, the skirt being made of a material that is thin, flexible, and gas-proof, a gap being left between at least one edge of the shield and the skirt.

5. A device according to claim 1, wherein the welding head also includes a mirror positioned immediately behind the front opening, the mirror deflecting the laser beam coming from the admission opening towards the front opening.

6. A device according to claim 5, the wall including a portion behind the front opening, wherein the welding head is of thickness no greater than 50 mm, the thickness being measured between the front opening and the portion of the wall behind the front opening.

7. A device according to claim 5, further comprising an enclosure of generally elongate shape, a source of laser light being disposed at a first end of said enclosure, the other end of said enclosure being attached to the welding head and surrounding the admission opening.

8. A device according to claim 7, wherein the laser light source is a point source and further comprising an optical system which gives a real image of the laser source at a focus in front of the front opening.

9. A device according to claim 8, wherein the laser source is an optical fiber.

10. A device according to claim 7, wherein the connection between the welding head and the enclosure is releasable.

11. A laser beam welding device comprising:
    a welding head including a wall defining a cavity, the wall having a first opening and a second opening;
    a laser source configured to provide a laser beam in the cavity via the first opening and out the cavity via the second opening;
    a first gas source configured to provide a first gas flow in the cavity via a first gas inlet and out the cavity via the second opening;
    a second gas source configured to provide a second gas flow via a second gas inlet, said second gas flow being directed so as to collide with the first gas flow outside said cavity; and
    a shield positioned outside said cavity and in front of the second opening, the shield being substantially flat and parallel to a front wall defining said second opening, said shield defining a hole in front of the second opening, the second gas inlet being positioned between the shield and the front wall.

12. The device according to claim 11, wherein said second gas flow is directed parallel to said front wall.

13. A device according to claim 11, wherein the shield is removable.

14. A device according to claim 11, wherein the shield comprises niobium.

15. A device according to claim 11, wherein the welding head includes a skirt surrounding the second opening, the second gas inlet, and the shield.

16. A device according to claim 11, wherein the welding head includes a mirror configured to deflect the laser beam coming from the first opening towards the second opening.

17. A device according to claim 11, wherein said laser source comprises an optical fiber.

18. A device according to claim 11, wherein said laser source comprises a laser.

19. A device according to claim 18, wherein said laser is an yttrium aluminum garnet laser.

20. A device according to claim 11, further comprising an optical system configured to provide a real image of the laser source at a focus position in front of the second opening.

* * * * *